United States Patent
Ackermann et al.

(10) Patent No.: US 8,533,924 B2
(45) Date of Patent: Sep. 17, 2013

(54) PROCESS FOR PRODUCING A PRESSURE VESSEL

(75) Inventors: Norbert Ackermann, Eitorf (DE); Thomas Meyer, Siegburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 812 days.

(21) Appl. No.: 12/617,190

(22) Filed: Nov. 12, 2009

(65) Prior Publication Data

US 2010/0116351 A1  May 13, 2010

(30) Foreign Application Priority Data

Nov. 12, 2008  (DE) .................. 10 2008 043 656

(51) Int. Cl.
*B23P 17/00* (2006.01)
*F16F 9/04* (2006.01)
*B21D 15/06* (2006.01)

(52) U.S. Cl.
USPC ..... 29/421.1; 72/59; 72/61; 72/60; 267/64.27

(58) Field of Classification Search
USPC .................... 29/421.1; 72/54, 58, 59, 60, 61, 72/367.1, 370.22; 267/127, 218, 64.19, 64.27
See application file for complete search history.

(56) References Cited

U.S. PATENT DOCUMENTS

| | | | |
|---|---|---|---|
| 2,997,291 A * | 8/1961 | Stultz | 188/266 |
| 3,123,347 A * | 3/1964 | Stormer et al. | 267/127 |
| 3,027,600 A | 4/1967 | Stormer et al. | |
| 3,512,612 A * | 5/1970 | Bragg et al. | 188/378 |
| 3,625,321 A * | 12/1971 | Lutz | 188/298 |
| 3,771,380 A * | 11/1973 | Bahr et al. | 74/573.1 |
| 4,506,423 A * | 3/1985 | Nakamura et al. | 29/890.14 |
| 4,742,898 A * | 5/1988 | Lee | 188/287 |
| 6,116,585 A * | 9/2000 | Lutz | 267/64.27 |
| 6,450,307 B2 * | 9/2002 | Lutz | 188/322.19 |
| 6,464,212 B2 * | 10/2002 | Lutz | 267/64.27 |
| 6,739,166 B1 * | 5/2004 | Shah | 72/57 |
| 6,820,317 B2 * | 11/2004 | Okada | 29/421.1 |
| 7,918,437 B2 * | 4/2011 | Ackermann | 267/64.27 |
| 8,091,200 B2 * | 1/2012 | Kobayashi et al. | 29/421.1 |
| 8,215,014 B2 * | 7/2012 | Amburgey | 29/888.02 |
| 2001/0008325 A1 * | 7/2001 | Lutz | 267/64.27 |
| 2012/0285213 A1 * | 11/2012 | Golovashchenko | 72/61 |

FOREIGN PATENT DOCUMENTS

DE  102 28 021  9/2005

* cited by examiner

*Primary Examiner* — Essama Omgba
(74) *Attorney, Agent, or Firm* — Cozen O'Connor

(57) ABSTRACT

Process for producing a pressure vessel having an enveloping body which occupies an arch shape in its predetermined installation position. The enveloping body has pillow-shaped portions which are connected to one another by stamped transitions at the inner diameter area of the enveloping body. The enveloping body for the intended installation position is placed with its inner diameter area one-sidedly on a die having a raised wedge-shaped profile. A designated outer diameter area of the enveloping body contacts a supporting surface, and the enveloping body is filled with a pressure medium so that the enveloping body is tensioned on the die and, in so doing, is plastically deformed in the area of the wedge-shaped profile.

6 Claims, 2 Drawing Sheets

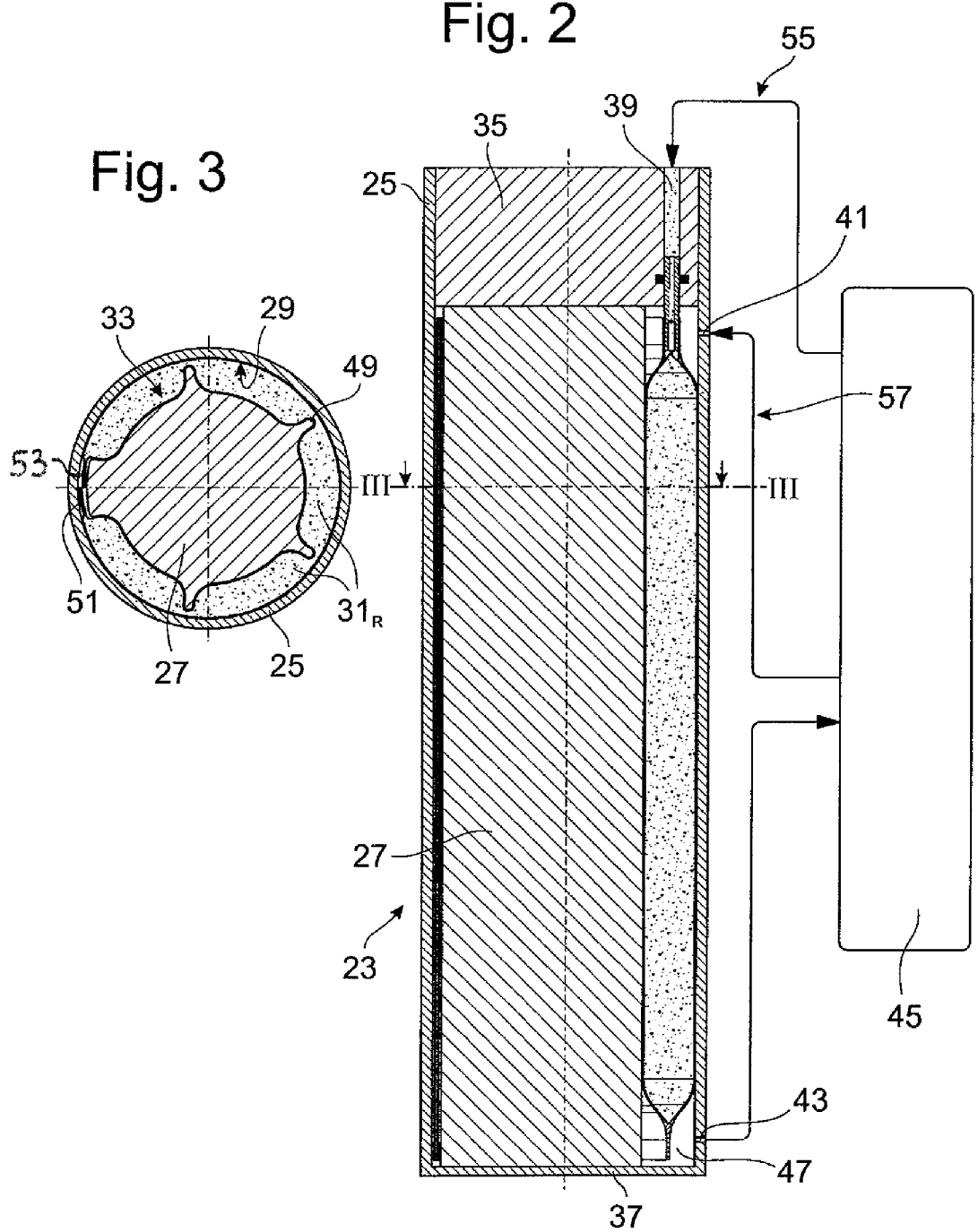

PROCESS FOR PRODUCING A PRESSURE VESSEL

BACKGROUND OF THE INVENTION

1. Field of the Invention

The invention is directed to a process for producing a pressure vessel having an enveloping body which occupies an arch shape in its predetermined installation position, wherein the enveloping body has pillow-shaped portions which are connected to one another by stamped transitions at the inner diameter area of the enveloping body.

2. Description of the Related Art

DE 102 28 021 B4 describes a vibration damper having an annular compensating space in which a pressure vessel is arranged. The pressure vessel comprises an enveloping body of foil material welded at its outer edge to form a pillow shape. By stamping the pillow-shaped blank, the pressure vessel can be installed in the annular compensating space of the vibration damper to form as few folds as possible.

As can be seen from FIG. 2 in DE 102 28 021 B4, the stamping leads to necking between two neighboring pillow-shaped portions, i.e., at the outer wall and at the inner wall of the enveloping body. Therefore, the annular cross section of the compensating space is not made use of to an optimal extent.

SUMMARY OF THE INVENTION

An object of the present invention is a pressure vessel that is better adapted to the annular compensating space which can be achieved with optimal formation of folds.

According to one embodiment of the invention, an enveloping body for the intended installation position is placed with its inner diameter area one-sidedly on a die having a raised wedge-shaped profile, a designated outer diameter area of the enveloping body contacts a supporting surface, and the enveloping body is filled with a pressure medium so that the enveloping body is tensioned on the die and, is plastically deformed in the area of the wedge-shaped profile.

The enveloping body is pre-stamped on its inner side, but no stamping is carried out in the outer diameter area. A pressure vessel, which is pre-shaped in this way, occupies its installed position in the compensating space of a vibration damper with a defined formation of folds in its installed state.

A front edge of the enveloping body considered in circumferential direction is aligned with an edge stamping profile of the die. Accordingly, the enveloping body can be optimally pre-shaped in the edge area, particularly with respect to a uniform pillow-shaped stamping.

According to another embodiment of the invention, a pressure gas is used as a pressure medium. This provides at least two important advantages. First, the enveloping body remains dry during the production sequence and, second, it can be determined more quickly whether or not the enveloping body is also gas tight. Gas-tightness of a pressure vessel is more difficult to achieve than liquid-tightness.

The pressure gas is distinct from a test gas surrounding the pressure vessel. The test gas is examined for fractions of pressure gas to determine the tightness of the pressure vessel. For example, a dyed pressure gas can be used and the test gas can be monitored for coloration.

In a device for carrying out the process, the die has an arch-shaped contour whose radius of curvature corresponds to the predetermined installation position of the pressure vessel. The production state should come as close as possible to the use state to achieve minimum deviations in the formation of folds in the enveloping body.

The device has an outer cylinder and an inner cylinder. An inner wall of the outer cylinder acts as a supporting surface, and an outside surface of the inner cylinder with its wedge-shaped profile acts as a die. The device corresponds in cross section to the subsequent installation space of the enveloping body.

The outer cylinder and inner cylinder of the device can be closed so as to be gastight by a cover and a base. The device has a filling connection for the pressure vessel. The device accordingly assumes a dual function, namely, as a stamping tool and as testing device.

To automate the test process, the device has an inlet connection and an outlet connection for a test gas circuit in which a test device is arranged.

The filling connection is identical to that at a piston-cylinder unit in which the pressure vessel is installed. The pressure vessel is removed from the device and can be installed in the piston-cylinder unit without additional modifications.

The invention will be described in more detail in the following description of the figures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 2 and 3 are a longitudinal sectional view and cross-sectional view through a device for carrying out the process according to the invention.

DETAILED DESCRIPTION OF THE PRESENTLY PREFERRED EMBODIMENTS

Figure 1:
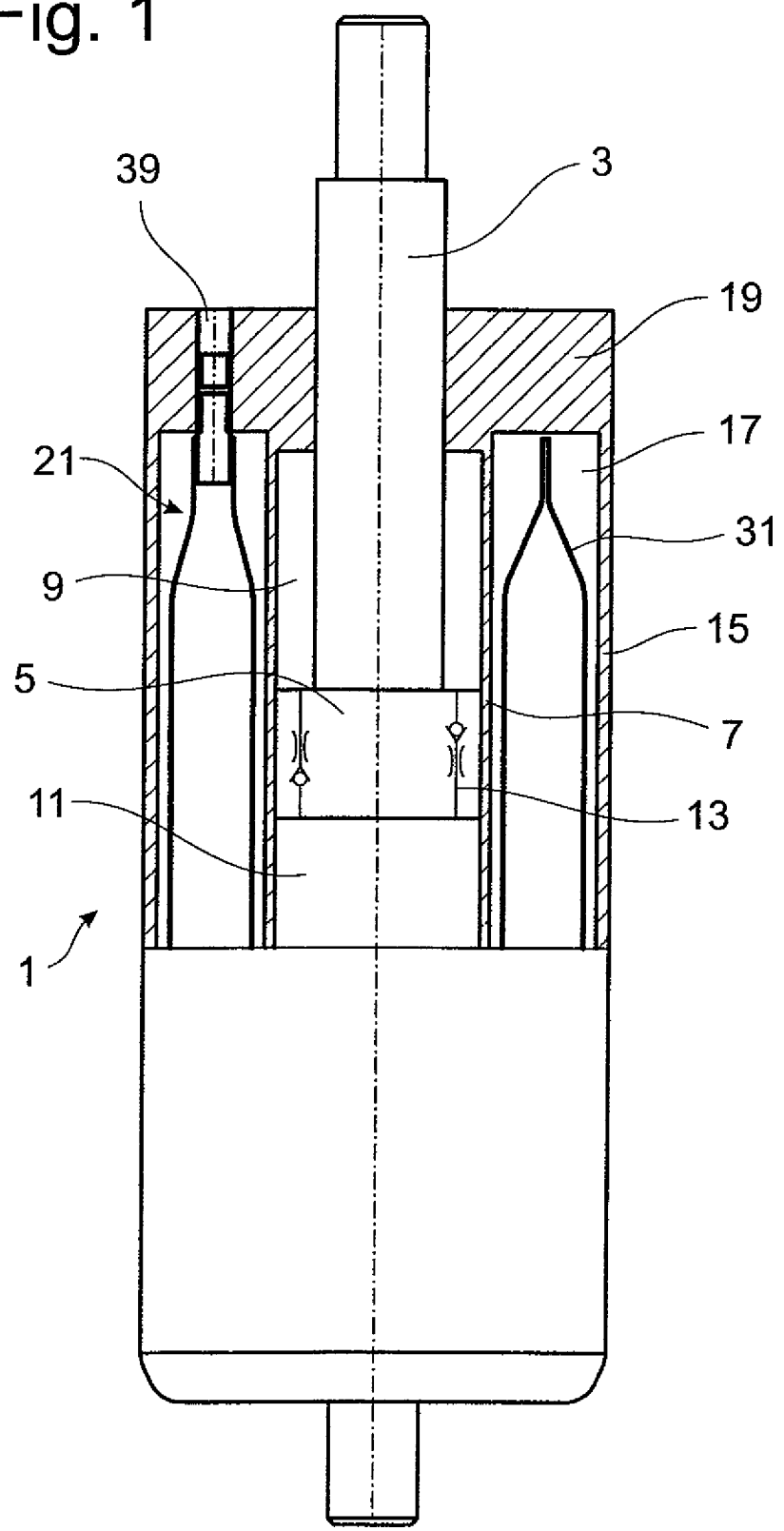
FIG. 1 is a vibration damper according to the prior art.

FIG. 1 shows a vibration damper 1 having a two-tube design in which a piston rod 3 with a piston 5 is guided so as to be movable axially in a pressure tube 7. The piston 5 divides the pressure tube into an upper work space 9 and a lower work space 11, the two work spaces being connected by damping valves 13 in the piston.

The pressure tube 7 is enclosed by a vessel tube 15. The inner wall of the vessel tube and the outer wall of the pressure tube form an annular compensating space 17 which is completely filled with damping medium up to a piston rod guide 19 and a pressure vessel 21 for an enclosed gas mass.

When the piston rod moves, the displaced piston rod volume is compensated by a change in volume of the pressure vessel 21 and of the enclosed gas mass. The annular compensating space 17 represents the predetermined installation position of the pressure body.

FIGS. 2 and 3 in conjunction show a device 23 which, like the vibration damper 1, has an outer cylinder 25 and an inner cylinder 27. The inner wall of the outer cylinder 25 corresponds in dimensioning to the vessel tube 15 and acts as a supporting surface 29 for an enveloping body 31 of the pressure vessel 21 (FIG. 1). The wedge-shaped profile of an outer surface of the inner cylinder acts as a die 33. The die 33 has an arch-shaped contour whose radius of curvature corresponds to the predetermined installation position of the pressure vessel 21 and to the outer diameter of the pressure tube 7 in the vibration damper 1.

The outer cylinder 25 and inner cylinder 27 of the device can be closed by a cover 35 and a base 37 so as to be gas tight. The device 23 has a filling connection 39 for the pressure vessel. The filling connection 39 corresponds to that on the vibration damper 1 in which the pressure vessel 21 is installed.

Further, the device has an inlet connection 41 and an outlet connection 43 for a test gas circuit. The connections 41 and 43 connect a test device 45 to an annular space 47. The annular space 47 determines the installation space for the enveloping body 31.

In the process for producing the pressure vessel 21, pillow-shaped portions $31_R$ are produced at the enveloping body 31 which assumes an arch shape in its predetermined installation position. The pillow-shaped portions $31_R$ are generated by stamped transitions at the inner diameter area of the enveloping body 31. For this purpose, the enveloping body 31 which comprises two plane walls which are welded together at the edges is placed with its inner diameter area one-sidedly on a die 33 for the intended installation position. The die 33 has the raised wedge-shaped profile (see FIG. 3). A designated outer diameter area of the enveloping body 31 can contact the supporting surface 29 when the enveloping body 31 is filled with a pressure medium. Under the influence of pressure in the interior of the enveloping body 31, the enveloping body 31 is tensioned on the die 33 and is accordingly plastically deformed in the area of the wedge-shaped profile. As can be seen from FIG. 3, the wedge-shaped profile is uniformly distributed on the circumferential area and provides for the pillow-shaped formation and transitions 49 between the pillow-shaped portions $31_R$ which ensures minimal folds in the installed state of the pressure vessel 21 in the vibration damper 1.

The enveloping body 31 is not arbitrarily inserted into the device 23, but rather a front edge 51 of the enveloping body considered in circumferential direction is aligned with an edge stamping profile 53 of the die 33.

After the unpressurized enveloping body 31 is inserted into the device 23, it is filled with a pressure gas 55 as pressure medium by means of the filling connection 39. The pressure gas differs from a test gas 57 provided in the surroundings of the pressure vessel, namely in the annular space 47 of the device 23 which is not filled by the enveloping body 31. The test gas 57 is examined during the production process of the pressure vessel for fractions of pressure gas 55 in the test device 45 to determine the tightness of the pressure vessel.

At the end of the process, the pre-stamped pressure vessel 21 is emptied of gas, removed from the device 23, and installed without gas in the vibration damper 1 having corresponding cross-sectional dimensions before the vibration damper is closed by the piston rod guide 19. The pressure vessel 21 is then filled again with pressure gas 55. The pressure vessel 21 assumes its arch-shaped contour, which is predetermined by stamping, with the pillow-shaped portions $31_R$ which are predetermined by the wedge-shaped profile.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process for producing a pressure vessel comprising an enveloping body that occupies an arch shape in its predetermined installation position, the enveloping body having a plurality of pillow-shaped portions connected to one another by stamped transitions at an inner diameter area of the enveloping body, the process comprising:

placing the enveloping body for the predetermined installation position with its inner diameter area one-sidedly on a die, the die having a raised wedge-shaped profile, wherein a designated outer diameter area of the enveloping body contacts a supporting surface;

filling the enveloping body with a pressure medium so that the enveloping body is tensioned on the die, and plastically deformed in the area of the wedge-shaped profile to thereby produce the stamped transitions that define the plurality of pillow-shaped portions, wherein a pressure gas is distinct from a test gas surrounding the pressure vessel, the process further comprising:

examining the test gas for fractions of pressure gas to determine a tightness of the pressure vessel.

2. The process according to claim 1, wherein a front edge of the enveloping body considered in circumferential direction, is aligned with an edge stamping profile of the die.

3. The process according to claim 1, wherein the pressure gas is used as the pressure medium.

4. A device for producing a pressure vessel comprising an enveloping body that occupies an arch shape in its predetermined installation position, the enveloping body having a plurality of pillow-shaped portions connected to one another by stamped transitions at an inner diameter area of the enveloping body, the process including placing the enveloping body for the predetermined installation position with its inner diameter area one-sidedly on a die, the die having a raised wedge-shaped profile, wherein a designated outer diameter area of the enveloping body contacts a supporting surface; and filling the enveloping body with a pressure medium so that the enveloping body is tensioned on the die, and plastically in the area of the wedge-shaped profile to thereby produce the stamped transitions that define the plurality of pillow-shaped portions, comprising:

an outer cylinder having an inner wall;

an inner cylinder having an outside surface, wherein the inner wall of the outer cylinder acts as the supporting surface, and the outside surface of the inner cylinder with its wedge-shaped profile acts as the die, wherein the die has an arch-shaped contour whose radius of curvature corresponds to the predetermined installation position of the pressure vessel; and an inlet connection and an outlet connection configured to be connected to a test gas circuit in which a test device is arranged.

5. The device according to claim 4, further comprising:

a filling connection for the pressure vessel;

a cover; and a base, wherein the outer cylinder and inner cylinder are configured to be closed by the cover and the base so as to be gas-tight.

6. The device according to claim 4, wherein the filling connection is substantially identical to a piston-cylinder unit filling connection in which the pressure vessel is to be installed.

* * * * *